(12) United States Patent
Vageline et al.

(10) Patent No.: US 7,876,703 B2
(45) Date of Patent: Jan. 25, 2011

(54) SYSTEM AND METHOD FOR ENABLING CONNECTION AMONG DEVICES IN A NETWORK

(75) Inventors: Michael P. Vageline, Tucson, AZ (US); Karl Allen Nielsen, Tucson, AZ (US); John C. Elliott, Tucson, AZ (US); Carl Evan Jones, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1291 days.

(21) Appl. No.: 10/461,058

(22) Filed: Jun. 13, 2003

(65) Prior Publication Data

US 2004/0252650 A1    Dec. 16, 2004

(51) Int. Cl.
*H04L 12/28* (2006.01)
(52) U.S. Cl. ............... 370/254; 370/395.2; 711/115
(58) Field of Classification Search ................. 370/254, 370/241.1, 243, 216, 229, 340, 395.2; 711/115
See application file for complete search history.

(56) References Cited

U.S. PATENT DOCUMENTS

| | | | |
|---|---|---|---|
| 4,449,182 A * | 5/1984 | Rubinson et al. ............... 710/60 |
| 4,779,261 A | 10/1988 | Yamagishi et al. |
| 4,956,836 A | 9/1990 | Boatwright |
| 5,219,297 A | 6/1993 | Stein et al. |
| 5,530,845 A * | 6/1996 | Hiatt et al. ..................... 703/27 |
| 5,890,214 A * | 3/1999 | Espy et al. ..................... 711/114 |
| 6,055,228 A | 4/2000 | DeKoning et al. |
| 6,185,639 B1 * | 2/2001 | Kailash et al. ................ 710/48 |
| 6,201,787 B1 | 3/2001 | Baldwin et al. |
| 6,215,775 B1 | 4/2001 | Baldwin et al. |
| 6,282,169 B1 | 8/2001 | Kiremidjian |
| 6,289,002 B1 | 9/2001 | Henson et al. |
| 6,523,070 B1 * | 2/2003 | Stapleton et al. ............ 709/250 |
| 6,606,690 B2 * | 8/2003 | Padovano ................... 711/148 |
| 6,771,656 B1 * | 8/2004 | Yoshihara ................... 370/449 |
| 2001/0050903 A1 * | 12/2001 | Vanlint ....................... 370/252 |
| 2003/0016624 A1 * | 1/2003 | Bare .......................... 370/217 |
| 2003/0093563 A1 * | 5/2003 | Young et al. ................ 709/245 |
| 2004/0085994 A1 * | 5/2004 | Warren et al. ............... 370/462 |

* cited by examiner

*Primary Examiner*—Seema S Rao
*Assistant Examiner*—Sai-Ming Chan
(74) *Attorney, Agent, or Firm*—David W. Victor; Konrad Raynes & Victor LLP

(57) ABSTRACT

Provided are a method, system, and program for adding a fourth device to a network including a first, second, and third devices, wherein the first and second devices are directly connected to the third device. The fourth device is directly connected to the third device while the first and second devices remain connected to the third device, and wherein the first and second devices continue to have access to the third device while the fourth device is connected to the third device.

11 Claims, 4 Drawing Sheets

SYSTEM AND METHOD FOR ENABLING CONNECTION AMONG DEVICES IN A NETWORK

BACKGROUND OF THE INVENTION

1. Field of the Invention

The present invention relates to a system for enabling connection among devices in a network.

2. Description of the Related Art

In a Fibre Channel Arbitrated Loop networks, devices are connected to one another to form a "loop" architecture, where all devices may communicate with any device in the loop. The connections are made with optical fibers or copper lines, which provide high bandwidth communication between the devices. Devices may be connected to the loop through two ports, where one port is used as a receiver and another as a transmitter. In such implementations, each fiber cable is attached to a transmitter of a port at one end and a receiver of another port at the other end. Alternatively, a single cable may be used for both receiving and transmitting data. In such case, the device need only have a single connection to another device in the loop. Devices connected in a Fibre Channel arbitrated loop may form a Storage Area Network (SAN), which may include numerous interconnected Fibre Channel Arbitrated Loops.

In one known architecture, a storage device drawer may include multiple hard disk drives and have two adaptor cards. Each adaptor card on the drawer may connect to an adaptor on a separate host system, where the fibre cable between each host and the drawer is bi-directional. Further, drawers may be daisy chained together, such that one host is connected to one storage drawer adaptor, and the other storage drawer adaptor is connected to an additional drawer. Any number of additional drawers may be daisy chained together, with the second host attached to the second adaptor of the last drawer in the daisy chain.

To add a drawer to the loop, if a drawer is connected to two separate hosts, then an administrator has to disconnect one host from one drawer adaptor, connect a cable between the new drawer and the drawer adaptor from which the host was disconnected, and then reconnect the host to the second adaptor on the new drawer. When the host is disconnected from the drawer, the Fibre Channel performs a loop initialization routine to configure the new arrangement. While the host remains disconnected, users can access data to the host remaining connected, but any users that accessed the loop through the disconnected host remain off-line and unable to access the data stored in the storage drawers. This downtime can be problematic, especially if the administrator takes a significant amount of time to connect the disconnected host to the new drawer.

Accordingly, there is a need in the art for improved techniques for adding devices to a loop.

SUMMARY OF THE DESCRIBED IMPLEMENTATIONS

Provided are a method, system, and program for adding a fourth device to a network including a first, second, and third devices, wherein the first and second devices are directly connected to the third device. The fourth device is directly connected to the third device while the first and second devices remain connected to the third device, and wherein the first and second devices continue to have access to the third device while the fourth device is connected to the third device.

In further implementations, the first and second devices access to the third device is only interrupted during an initialization procedure executed when the fourth device is connected to the third adaptor to recognize the fourth device.

In still further implementations, the first and second devices comprise host systems and wherein the third and fourth devices comprise storage devices.

Yet further, the third device may include three adaptor cards, wherein the first and second devices are each connected to one separate adaptor card in the third device, and wherein connecting the fourth device to the third device comprises connecting an adaptor card on the third device to one of the available adaptor cards in the third device.

Described implementations provide apparatus and techniques for connecting one additional device to another device in a manner that allows other devices to remain connected to the device to which the additional device is being connected.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
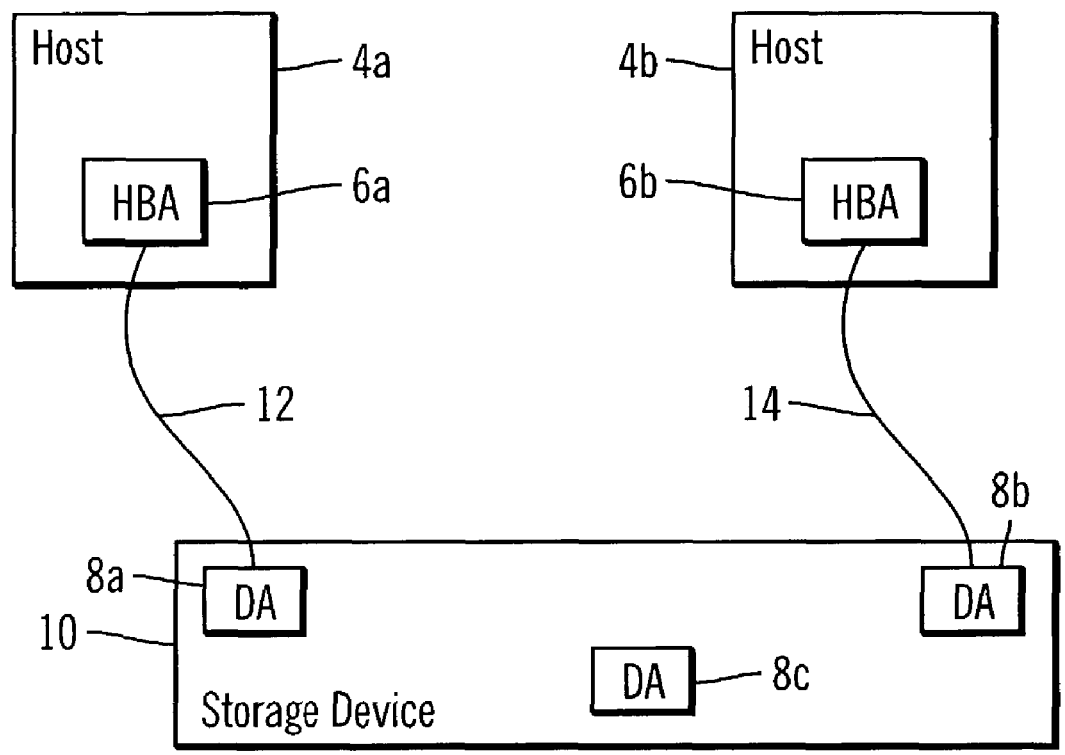
FIGS. 1, 2, and 3 illustrate network devices connected in accordance with implementations of the invention.

FIG. 1 illustrates a loop network architecture 2 in accordance with implementations of the invention. Two hosts 4a, 4b each having host bus adaptors (HBAs) 6a, 6b connect to a separate device adaptor (DA) 8a and 8b on storage device 10, which has an additional device adaptor 8c comprising a bypass circuit. Each of the adaptors 8a, 8b, and 8c may comprise device adaptors known in the art for connecting a device to a network, such as a Fibre Channel Arbitrated Loop. The cables 12 and 14 connecting the hosts 4a and 4b to adaptors 8a and 8b may enable bidirectional communication therebetween. The hosts 4a, 4b may comprise any type of computer system known in the art, including a server capable of managing data access requests from attached clients to any storage devices in the loop 2. The storage device 10 may comprise a "drawer", having numerous interconnected hard disk drives. The hard disk drives 10 in the storage device 10 may be configured as a Redundant Array of Independent Disks (RAID), Just a Bunch of Disks (JBOD), a Direct Access Storage Device (DASD), etc.

Figure 2:
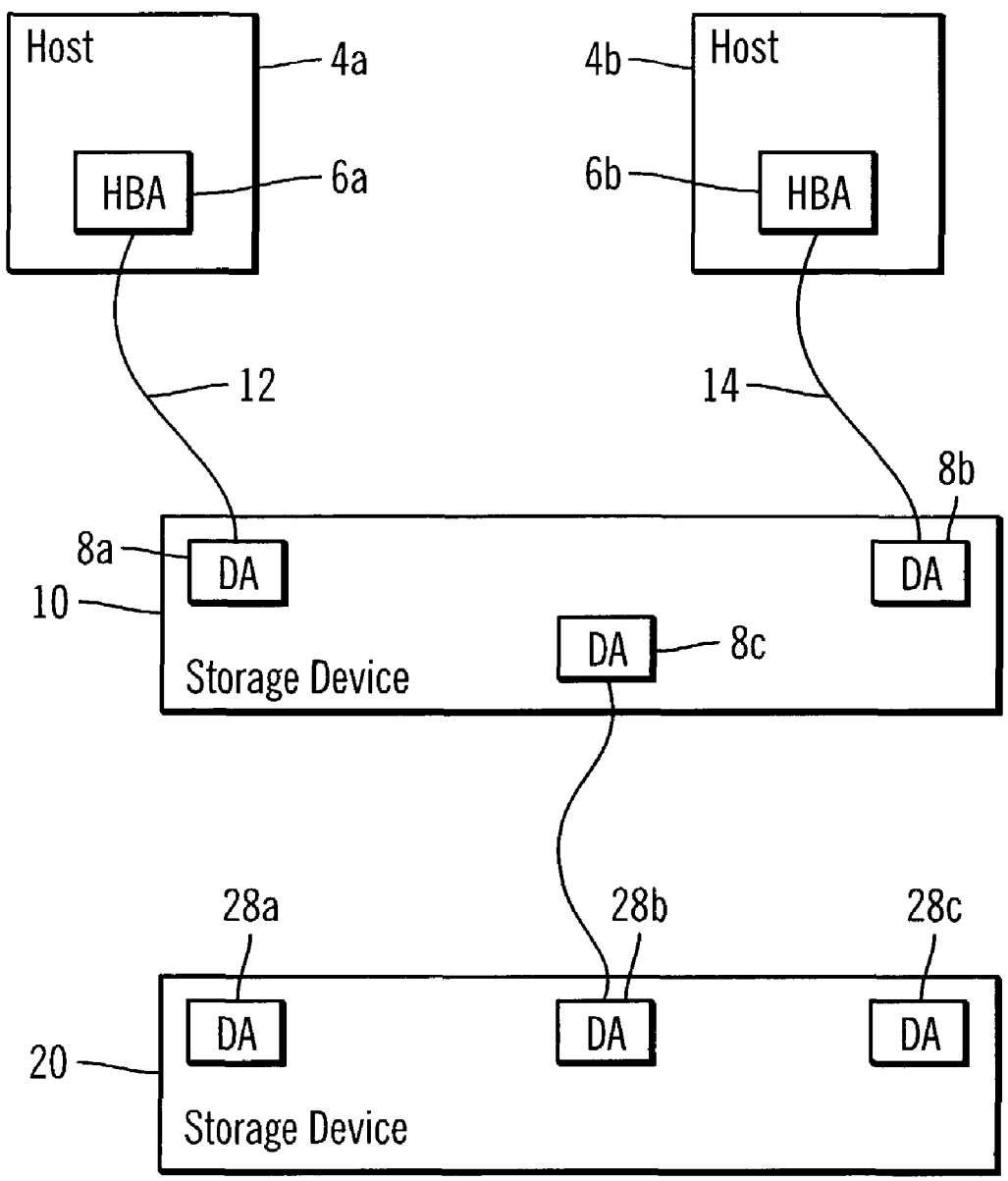

FIG. 2 illustrates the state of the network after a storage device 20 having at least two adaptors 28a, 28b, 28c, three are shown, is added to the network 2. To add the storage device 20, the administrator would connect a cable from the third bypass adaptor 8c in storage device 10 to one of the adaptors 28a, 28b, or 28c. Upon connecting storage device 20 to the bypass adaptor 8c, a loop initialization routine, such as the Fibre Channel Arbitrated Loop initialization routine, would be performed to recognize the added storage device 20 and make the storage device 20 available to all other devices in the loop network 2, including hosts 4a, 4b. Because the loop initialization time is very fast, the hosts 4a, 4b appear to have continued access to the storage device 10 while storage device 20 is added to the loop 2. The host 4a, 4b access is only briefly disrupted during the initialization operation. There are no interruptions due to physically disconnecting one host 4a, 4b from the storage device 10 to add another storage device 20, because the new storage device 20 is connected to the bypass adaptor 8c.

Moreover, interruptions would further be minimized when removing the storage device 20 that was added to the third bypass adaptor 8c of the storage device 10 connected to the two hosts 4a, 4b. With the described implementations, the storage device 20 is removed by disconnecting the storage device 20 from the bypass adaptor 8c which does not require any physical disruption to the connection with the hosts 4a, 4b through device adaptors 8a, 8b.

With the described implementation, when adding the new storage device, the cables connecting to the hosts remain undisturbed and continue to be used, thereby avoiding any disruption in host access to the storage device 10. In the prior art, when disconnecting a host from a storage device to add a new storage device, and then reconnecting the disconnected host to the added storage device, a cable of different length may be needed because the host is being connected to a new storage device, which may be located at a different distance from the host than the storage device to which the host was previously connected. In the prior art, the duration of the disconnection may be extended if the administrator has to locate a cable of appropriate length to connect the host to the new storage device. With the described implementations, there are no such delays because the hosts remain connected to the storage device while the new storage device is added to the loop.

Figure 3:
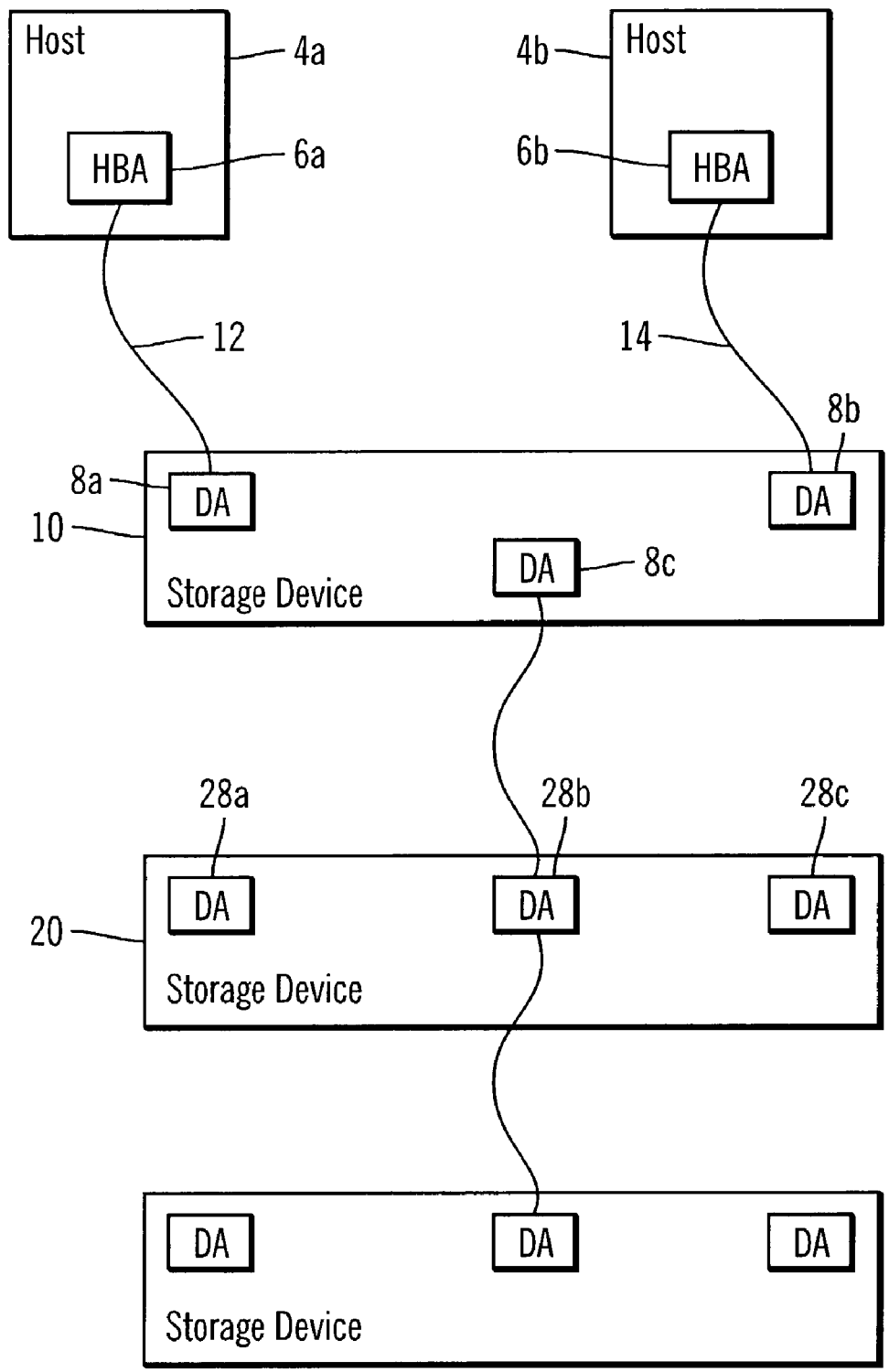
Figure 4:
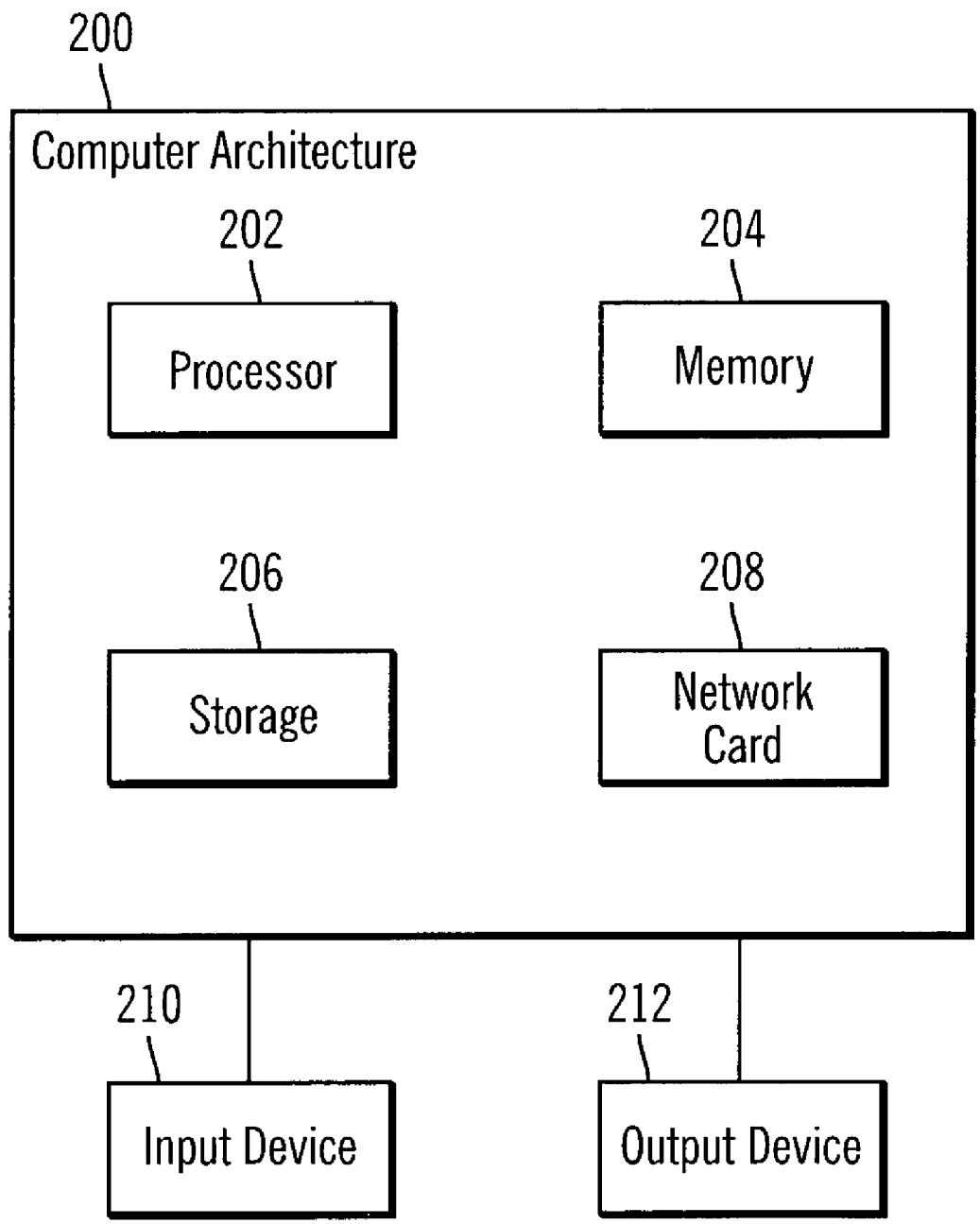
FIG. 4 illustrates an architecture of computing components in the network environment, such as the hosts and storage devices, and any other computing devices.

FIG. 4 illustrates one implementation of a computer architecture 200 of the network components, such as the hosts and storage devices shown in FIGS. 1, 2, and 3. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network, such as a Fibre Channel Arbitrated Loop. As discussed, certain of the network devices may have multiple network cards. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

In the described implementations, the hosts included one host bus adaptor and the storage devices had three adaptors. In alternative implementations, the hosts may have multiple host bus adaptors or multiple ports on one HBA. Further, devices other than storage devices may be designed to have three adaptors capable of providing separate bidirectional connection with other network devices. Still further, if the cables only allow for unidirectional communication, then each adaptor would need two ports to connect to each device, one for transmitting and one for receiving.

In further implementations, the hosts may connect to different ports on the same adaptor in the storage device, thereby requiring fewer adaptors to enable the storage drawer to separately connect to three other devices.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A network, comprising:
a first host having a first host adaptor;
a second host having a second host adaptor;
a first storage device having a first, second, and third device adaptors;
a second storage device having a fourth device adaptor;
a first cable directly connecting the first host adaptor to the first device adaptor;
a second cable directly connecting the second host adaptor to the second device adaptor; and
a third cable directly connecting the third device adaptor to the fourth device adaptor, wherein the first and second hosts and first and second storage devices are accessible to each other in a network, wherein the first and second hosts continue to have access to the first storage device via the first and second cables while the second storage device is connected to the first storage device via the third cable, wherein physically connecting the second storage device to the first storage device with the third cable does not interrupt the first and second hosts access to the first storage device, wherein the first and second hosts data access to the first storage device is interrupted during an initialization procedure executed to make the second storage device available to the first and second hosts when the second storage device is connected to the third cable to connect to the first storage device.

2. The network of claim 1, wherein the network comprises a loop architecture.

3. The network of claim 1, wherein the storage devices each include a plurality of interconnected hard disk drives.

4. A first device capable of being in communication with a second, third, and fourth devices in a network, wherein the second, third, and fourth devices have adaptors, comprising:
a first, second, and third adaptors;
a first cable for directly connecting the first adaptor to the adaptor in the second device;
a second cable for directly connecting the second adaptor to the adaptor in the third device;
a third cable for directly connecting the third adaptor to the adaptor in the fourth device, wherein the second and third devices continue to have access to the first device via the first and second cables while the fourth device is connected to the first device via the third cable, wherein physically connecting the fourth device to the first device with the third cable does not interrupt the second and third devices access to the first device, and wherein the second and third devices access to the first device is interrupted during an initialization procedure executed to make the fourth device available to the second and third devices when the fourth device is connected to the third cable to connect to the third device.

5. The first device of claim 4, wherein the second and third devices comprise host systems and wherein the first and fourth devices comprise storage devices.

6. The first device of claim 4, wherein the network comprises a loop architecture.

7. A method for adding a fourth device to a network including a first, second, and third devices, wherein the first and second devices each include an adaptor and are directly connected via first and second cables to the third device, wherein the first cable directly connects the first device adaptor to a first adaptor in the third device and wherein the second cable directly connects the second device adaptor to a second adaptor in the third device, comprising:

connecting the fourth device directly to the third device by connecting an adaptor in the fourth device to a third adaptor in the third device via a third cable while the first and second devices remain connected to the third device, wherein the first and second devices continue to have access to the third device while the fourth device is connected to the third device via the third cable, wherein physically connecting the fourth device to the third device with the third cable does not interrupt the first and second devices access to the third device, and wherein the first and second devices access to the third device is interrupted during an initialization procedure executed to make the fourth device available to the first and second devices when the fourth device is connected to the third device.

8. The method of claim 7, wherein the first and second devices comprise host systems and wherein the third and fourth devices comprise storage devices.

9. The first device of claim 4, wherein the first and fourth devices comprise storage devices each including a plurality of interconnected hard disk drives.

10. The method of claim 7, wherein the third and fourth devices comprise storage devices each including a plurality of interconnected hard disk drives.

11. The method of claim 7, wherein the first, second and third devices communicate over a network having a loop architecture.

* * * * *